(12) United States Patent
Chen et al.

(10) Patent No.: US 7,256,914 B1
(45) Date of Patent: Aug. 14, 2007

(54) OPTICAL SCANNER

(75) Inventors: Hsi-Yu Chen, Taipei (TW);
Kuan-Yang Chen, Taipei (TW)

(73) Assignee: Primax Electronics Ltd., Taipei (TW)

( * ) Notice: Subject to any disclaimer, the term of this patent is extended or adjusted under 35 U.S.C. 154(b) by 0 days.

(21) Appl. No.: 11/422,276

(22) Filed: Jun. 5, 2006

(30) Foreign Application Priority Data

Mar. 31, 2006 (TW) .............................. 95111363 A

(51) Int. Cl.
*H04N 1/04* (2006.01)

(52) U.S. Cl. ........................................ 358/497; 358/474

(58) Field of Classification Search ................ 358/497, 358/494, 474, 471, 487, 401, 472, 473, 483, 358/482, 512–514, 505, 506, 501; 250/234–236, 250/208.1, 239, 216; 399/91–95, 379, 380, 399/211, 212; 382/312, 313
See application file for complete search history.

(56) References Cited

U.S. PATENT DOCUMENTS

| 4,661,826 A * | 4/1987 | Saitou ........................ 347/215 |
| 5,504,562 A * | 4/1996 | Velazquez .................... 399/92 |
| 5,810,463 A * | 9/1998 | Kawahara et al. .......... 362/601 |
| 6,947,184 B1 * | 9/2005 | Onishi et al. ............... 358/472 |
| 7,202,980 B2 * | 4/2007 | Hayashi ..................... 358/475 |

* cited by examiner

*Primary Examiner*—Cheukfan Lee

(57) ABSTRACT

An optical scanner for scanning a document includes a housing, a glass platform, an optical scanning module and a heat dissipating member. The glass platform is disposed on the housing for placing thereon the document to be scanned. The optical scanning module is disposed inside the housing for scanning the document. The heat dissipating member is disposed inside the housing and in contact with a first lateral edge of the glass platform for conducting the heat generated from the optical scanning module to the glass platform such that the heat is then radiated from the glass platform to the outside of the housing.

7 Claims, 5 Drawing Sheets

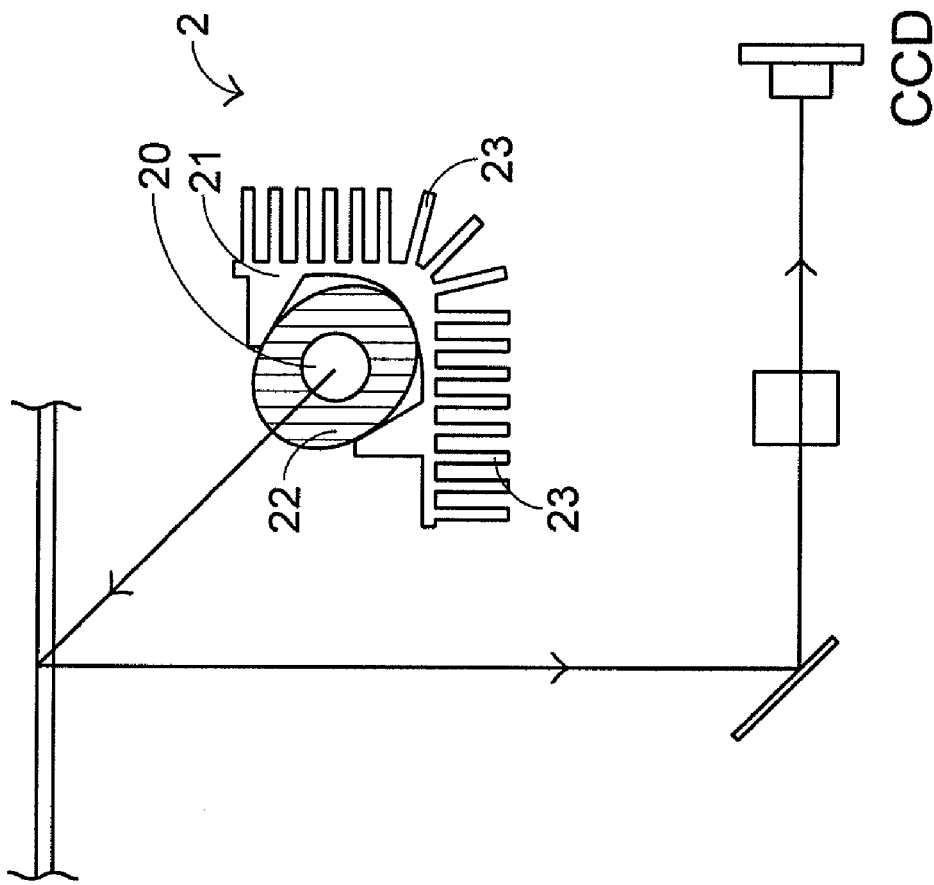

OPTICAL SCANNER

FIELD OF THE INVENTION

The present invention relates to an optical scanner, and more particularly to an optical scanner having a heat dissipating member.

BACKGROUND OF THE INVENTION

With increasing development of image processing technologies, flatbed image scanners become essential electronic devices for scanning documents. The images of the scanned documents are converted into image files, which can be stored in a computer or further processed by the computer.

Referring to FIG. 1(a), a schematic view of a flatbed image scanner is illustrated. As shown in FIG. 1(a), the flatbed image scanner 1 comprises a glass platform 11 and an optical scanning module 13. The glass platform 11 is used for placing thereon a document 12 to be scanned. The optical scanning module 13 is the main component of the flatbed image scanner 1. After the document 12 is placed on the glass platform 11, the optical scanning module 13 is moved along the scanning direction so as to scan the document 12.

Please refer to FIG. 1(b), which is a cross-sectional side view illustrating the internal components of the optical scanning module 13. In the housing 130 of the optical scanning module 13, a light source 131, a reflective mirror set 132, an optical lens 133 and an optical sensor 134 are included. A light-transmissible window 135 is arranged in the top surface of the housing 130. The process for performing a scanning operation will be illustrated as follows. Firstly, the light emitted by the light source 131 is projected onto the document 12 to be scanned. The light reflected from the opaque object 14 is then transmitted into the optical scanning module 13 through the light-transmissible window 135, which is arranged in the top surface of the housing 130. After passing through the light-transmissible window 135, the light is successively reflected by the plural reflective mirrors of the reflective mirror set 132, and then focused by the optical lens 133. The focused light is then imaged onto the optical sensor 134 to convert the optical signals reflected from the scanned document 12 into corresponding image signals.

As known, heat is generated during the optical scanning module 12 performs the scanning operation on the document 12. On the other hand, in a case a flatbed image scanner having relatively large volume and ordinary resolution, the electronic components included in the optical scanning module 13, for example the optical sensor, are not evidently and adversely influenced by the heat generation.

Since the image scanner is developed toward increased resolution and slim volume, the heat generated from the optical scanning module 13 may impair the scanning quality of the flatbed image scanner. Therefore, it is desired to remove the heat generated from the optical scanning module 13.

A heat-dissipating mechanism for use with a light source assembly of an optical scanner described in Taiwanese Patent Gazette No. 461657, and the contents of which are hereby incorporated by reference. A schematic cross-sectional view of the light source assembly as disclosed in Taiwanese Patent No. 461657 is illustrated in FIG. 2. As shown in FIG. 2, the light source assembly 2 comprises a lamp tube 20, a lamp holder 21 and a rubber body 22. The lamp tube 20 is sheathed by the rubber body 22 and fixed on the lamp holder 21 via the rubber body 22. In accordance with the main feature of this reference, a plurality of heat sink fins 23 are integrally formed on the surface of the lamp tube 20. During scanning operation, the heat generated from the lamp tube 20 is conducted to the heat sink fins 23 and then radiated from the heat sink fins 23 to the ambient air so as to achieve the object of heat dissipation. For increasing the heat-dissipating efficiency, an addition fan assembly (not shown) is provided. Since the heat sink fins 23 and the fan occupy much space inside the optical scanning module, the flatbed image scanner fails to be made in a slim type.

In views of the above-described disadvantages of the prior art, the applicant keeps on carving unflaggingly to develop an improved optical scanner according to the present invention through wholehearted experience and research.

SUMMARY OF THE INVENTION

It is an object of the present invention to provide an optical scanner capable of effectively dissipating the heat generated from the lamp tube therein without considerably increasing the overall volume.

In accordance with an aspect of the present invention, there is provided an optical scanner for scanning a document. The optical scanner comprises a housing, a glass platform, an optical scanning module and a heat dissipating member. The glass platform is disposed on the housing for placing thereon the document to be scanned. The optical scanning module is disposed inside the housing for scanning the document. The heat dissipating member is disposed inside the housing and in contact with a first lateral edge of the glass platform for conducting the heat generated from the optical scanning module to the glass platform such that the heat is then radiated from the glass platform to the outside of the housing.

In an embodiment, the optical scanning module further comprises a lamp tube for emitting a source light to scan the document.

In an embodiment, the heat dissipating member comprises a first heat-dissipating sheet, a second heat-dissipating sheet and a third heat-dissipating sheet.

In an embodiment, the first heat-dissipating sheet is disposed on the first lateral edge of the glass platform corresponding to the home position of the optical scanning module, and the second heat-dissipating sheet and the third heat-dissipating sheet are disposed on two other lateral edges of the glass platform, respectively.

Preferably, the heat dissipating member is made of metallic material.

In an embodiment, the heat dissipating member is attached and glued onto the first lateral edge of the glass platform.

Preferably, the optical scanner is a flatbed image scanner.

The above objects and advantages of the present invention will become more readily apparent to those ordinarily skilled in the art after reviewing the following detailed description and accompanying drawings, in which:

BRIEF DESCRIPTION OF THE DRAWINGS

FIG. 2 is a schematic cross-sectional view illustrating a heat-dissipating mechanism for use with a light source assembly of a conventional optical scanner;

DETAILED DESCRIPTION OF THE PREFERRED EMBODIMENT

Figure 1A:
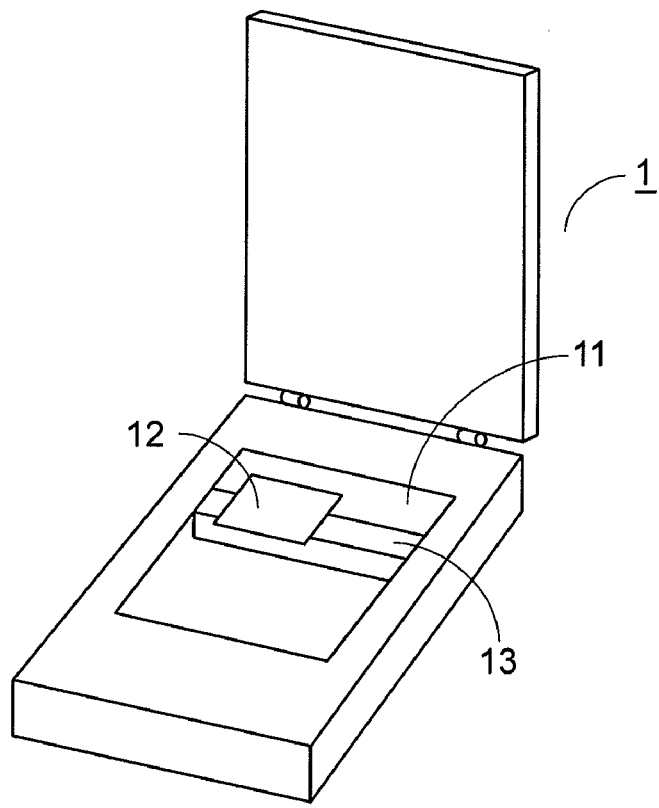
FIG. 1(a) is a schematic view of a typical flatbed image scanner.
Figure 1B:
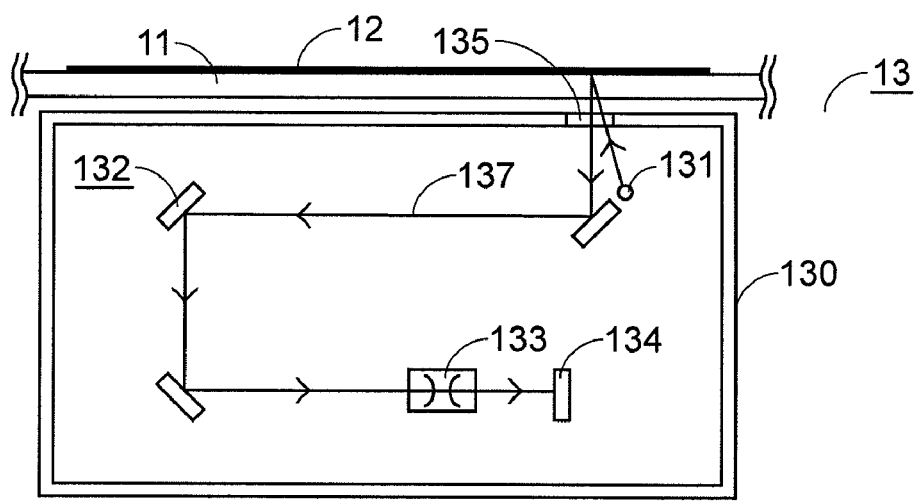
FIG. 1(b) is a schematic cross-sectional side view illustrating the internal components of the optical scanning module of the flatbed image scanner.
Figure 3A:
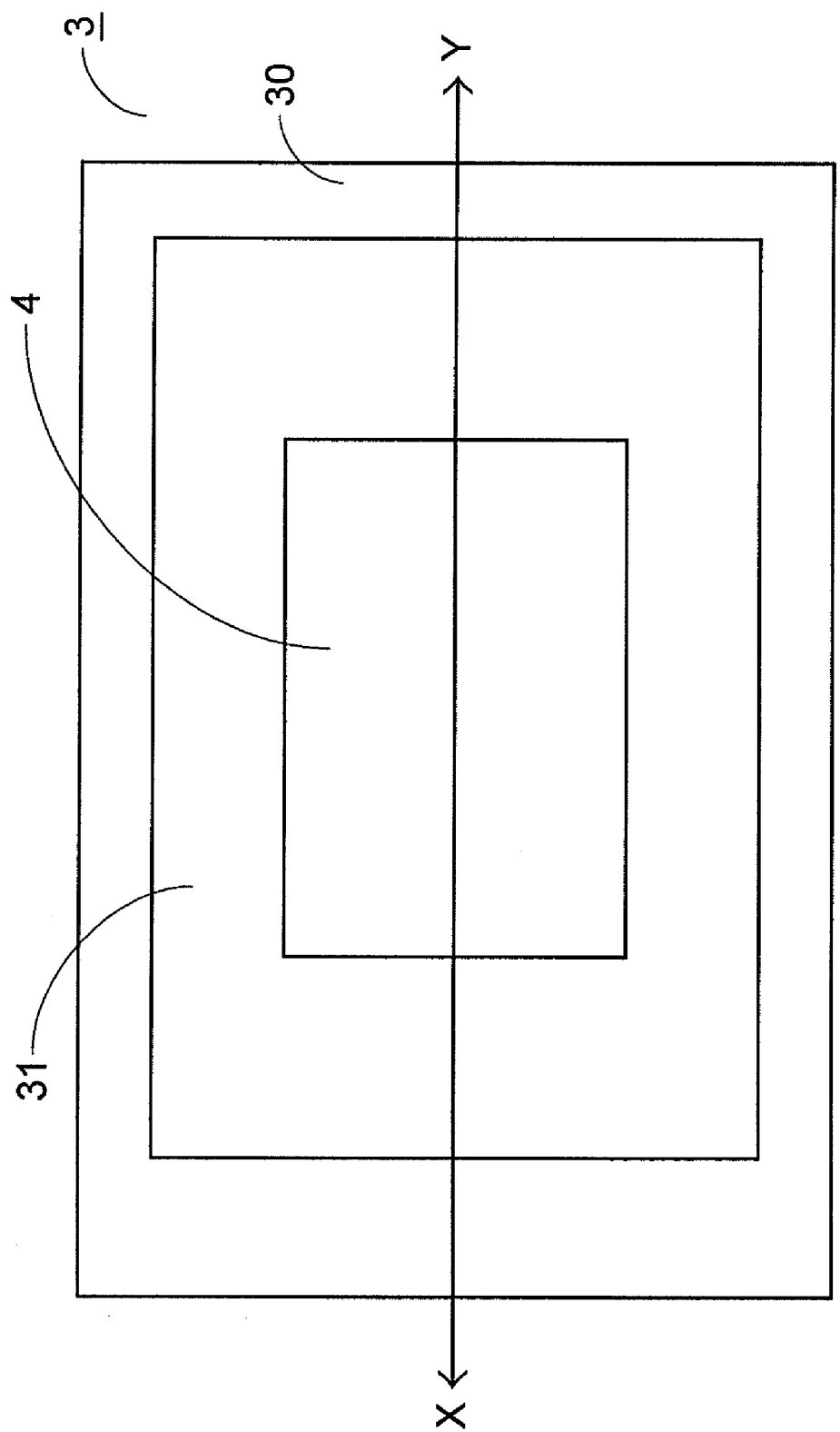
FIG. 3(a) is a schematic top view of an optical scanner according to a preferred embodiment of the present invention.
Figure 3B:
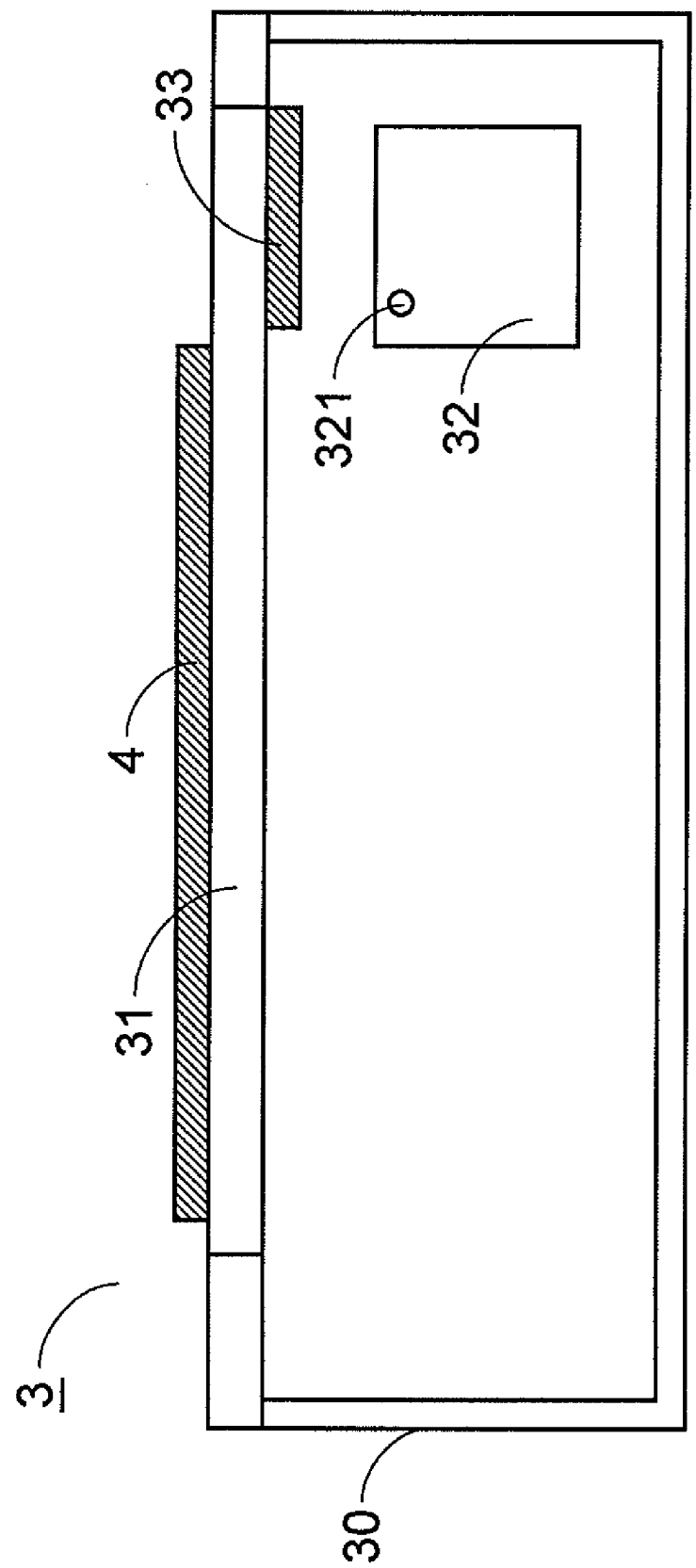
FIG. 3(b) is a schematic cross-sectional view of an optical scanner according to a preferred embodiment of the present invention.

Please refer to FIGS. 3(a) and 3(b), which are schematic top and cross-sectional views of an optical scanner according to a preferred embodiment of the present invention. An exemplified optical scanner as shown in FIGS. 3(a) and 3(b) is a flatbed image scanner 3 for scanning a document 4. In FIG. 3(a), the flatbed image scanner 3 comprises a housing 30 and a glass platform 31. The glass platform 31 is disposed on the housing 30 and used for placing thereon the document 4 to be scanned. Please refer to FIG. 3(b), which is a cross-sectional view of the flatbed image scanner 3 taken along the line XY. As shown in FIG. 3(b), the flatbed image scanner 3 further comprises an optical scanning module 32 and a heat dissipating member 33, which are disposed inside the housing 30. The optical scanning module 32 has a lamp tube 321 therein for emitting a source light to be projected onto the document 4. Due to the heat generated from the lamp tube 321, the temperature inside the optical scanning module 32 is increased. In accordance with a major feature of the present invention, the heat dissipating member 33, which is made of metallic material, is arranged inside the housing 30 but outside the optical scanning module 32. It is preferred that the heat dissipating member 33 is arranged between the optical scanning module 32 and the glass platform 31. The heat dissipating member 33 is attached and glued onto the bottom side of the glass platform 31. Since the glass platform 31 is made of glass, which has satisfactory thermal conductivity, the heat generated from the lamp tube 321 is conducted to the heat dissipating member 33 and then transferred to the glass platform 31. Subsequently, the heat is radiated from the glass platform 31 to the ambient air so as to achieve the object of heat dissipation. The detailed position of the heat dissipating member 33 will be further illustrated as follows.

Figure 4:
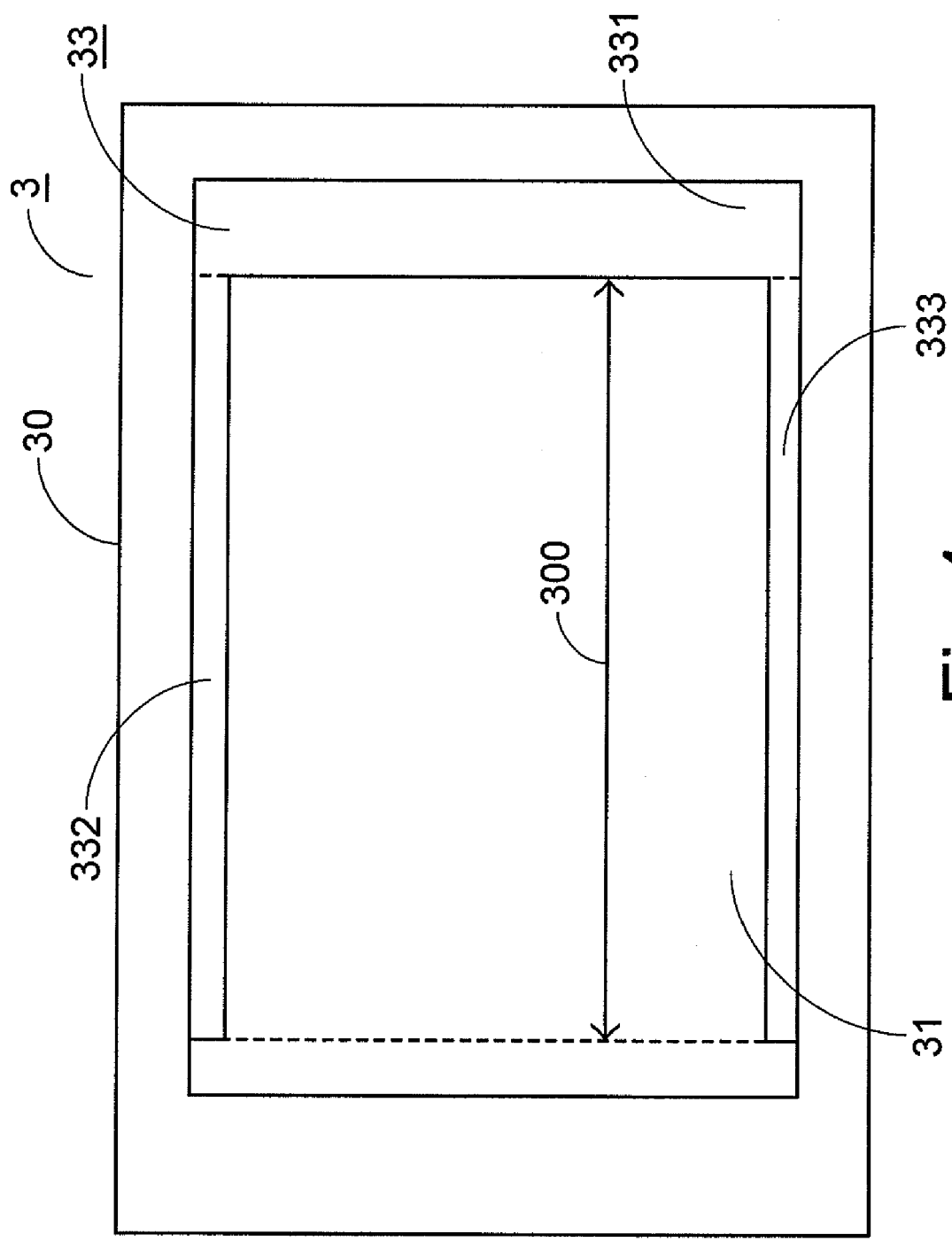
FIG. 4 is a partially bottom view of the flatbed image scanner including the heat dissipating member and the glass platform.

Referring to FIG. 4, a partially bottom view of the flatbed image scanner 3 including the heat dissipating member 33 and the glass platform 31 is illustrated. The heat dissipating member 33 comprises a first heat-dissipating sheet 331, a second heat-dissipating sheet 332 and a third heat-dissipating sheet 333, which are attached and glued to the bottom surface of the glass platform 31 at three different lateral edges. The first heat-dissipating sheet 331 is disposed inside the housing 30 and above the home position of the optical scanning module 32. The second heat-dissipating sheet 332 and the third heat-dissipating sheet 333 are disposed along the scanning direction 300 of the optical scanning module 32 as is indicated by the arrow. As a consequence, the heat generated during the optical scanning module 32 is moved along the scanning direction 300 for scanning the document 4 will be conducted to the second heat-dissipating sheet 332 and the third heat-dissipating sheet 333 and then transferred to the glass platform 31 to be radiated outside the housing 30. After the scanning operation is finished, the optical scanning module 32 will be stayed at the home position to wait for next scanning operation. Under this circumstance, the heat generated during the optical scanning module 32 will be conducted to the first heat-dissipating sheet 331, which is disposed above the home position of the optical scanning module 32, and then transferred to the glass platform 31 to be radiated outside the housing 30.

It is noted that, however, those skilled in the art will readily observe that numerous modifications and alterations of the heat dissipating member 33 may be made while retaining the teachings of the invention. For example, depending on the manufacturer's design, one or more heat-dissipating sheets included in the heat dissipating member 33 are desired. Accordingly, the above disclosure should be limited only by the bounds of the following claims Conventionally, the home position of the optical scanning module in the typical scanner is disposed under the opaque housing. For enhancing the heat dissipating efficiency, the glass platform 31 of the flatbed image scanner 3 according to the present invention is lengthened to the region above the home position of the optical scanning module 32, i.e. above the first heat-dissipating sheet 331. Also, the area of the glass platform 31 is widened to the regions where the second heat-dissipating sheet 332 and the third heat-dissipating sheet 333 are attached thereon. As a consequence, the heat generated when the optical scanning module 32 performs the scanning operation will be conducted to the heat dissipating member 33 and then transferred to the glass platform 31 to be radiated outside the housing 30.

From the above description, the flatbed image scanner of the present invention is effective to dissipate heat generated from the lamp tube of the optical scanning module by attaching and gluing the heat dissipating member onto the lateral edges of the glass platform inside the housing. In such way, the heat is conducted to the heat dissipating member and then transferred to the glass platform to be radiated outside the housing. In comparison with the conventional heat-dissipating mechanism including the heat sink fins and the fan assembly, the heat dissipating member of the present invention is thin without occupying much space of the scanner. Therefore, the flatbed image scanner of the present invention can be made in a slim type.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. An optical scanner for scanning a document, said optical scanner comprising:

a housing;

a glass platform disposed on said housing for placing thereon said document to be scanned;

an optical scanning module disposed inside said housing for scanning said document; and a heat dissipating member disposed inside said housing and in contact with a first lateral edge of said glass platform for conducting the heat generated from said optical scanning module to said glass platform such that the heat is then radiated from said glass platform to the outside of said housing.

2. The optical scanner according to claim 1 wherein said optical scanning module further comprises a lamp tube for emitting a source light to scan said document.

3. The optical scanner according to claim 1 wherein said heat dissipating member comprises a first heat-dissipating sheet, a second heat-dissipating sheet and a third heat-dissipating sheet.

4. The optical scanner according to claim 3 wherein said first heat-dissipating sheet is disposed on said first lateral edge of said glass platform corresponding to the home position of said optical scanning module, and said second heat-dissipating sheet and said third heat-dissipating sheet are disposed on two other lateral edges of said glass platform, respectively.

5. The optical scanner according to claim 1 wherein said heat dissipating member is made of metallic material.

6. The optical scanner according to claim 1 wherein said heat dissipating member is attached and glued onto said first lateral edge of said glass platform.

7. The optical scanner according to claim 1 wherein said optical scanner is a flatbed image scanner.

* * * * *